No. 743,851. PATENTED NOV. 10, 1903.
R. H. FOWLER & G. S. TUER.
ROAD LOCOMOTIVE.
APPLICATION FILED MAY 25, 1903.
NO MODEL. 2 SHEETS—SHEET 1.
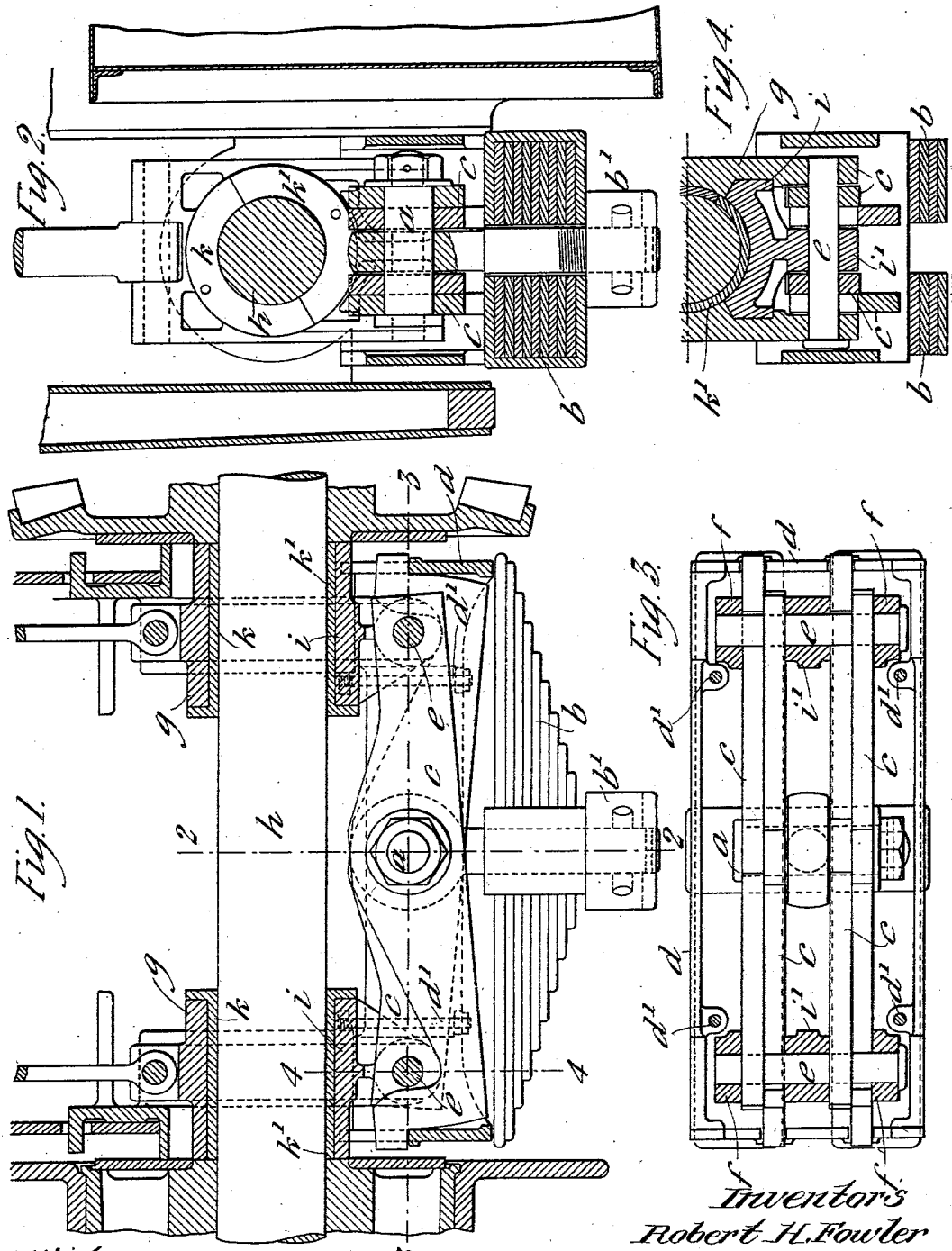
Witnesses:
Inventors
Robert H. Fowler
George S. Tuer
By James L. Norris.
Atty.

No. 743,851. PATENTED NOV. 10, 1903.
R. H. FOWLER & G. S. TUER.
ROAD LOCOMOTIVE.
APPLICATION FILED MAY 25, 1903.
NO MODEL. 2 SHEETS—SHEET 2.
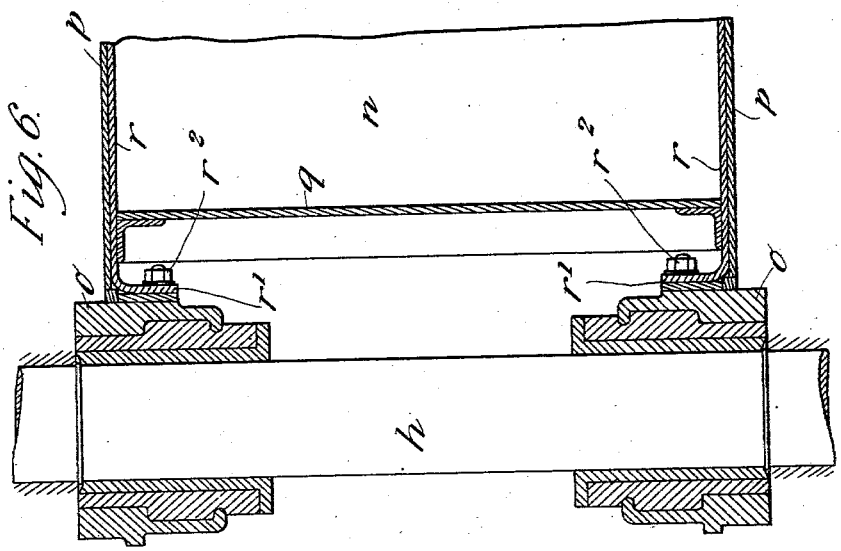
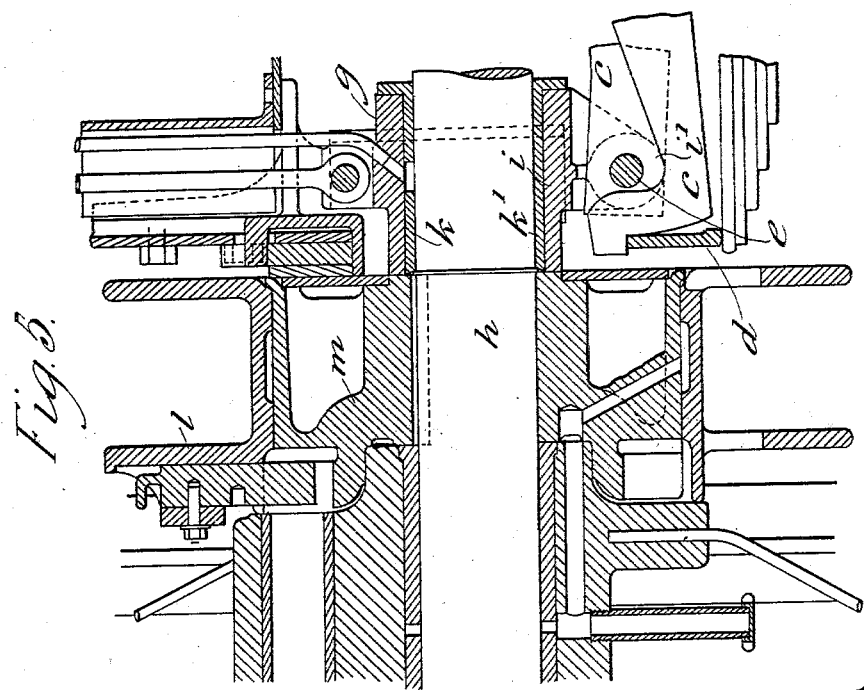
Witnesses:
Inventor
Robert H. Fowler
George S. Tuer
By James L. Norris
Atty.

No. 743,851. Patented November 10, 1903.

UNITED STATES PATENT OFFICE.

ROBERT HENRY FOWLER AND GEORGE SCHOFIELD TUER, OF LEEDS, ENGLAND.

ROAD-LOCOMOTIVE.

SPECIFICATION forming part of Letters Patent No. 743,851, dated November 10, 1903.

Application filed May 25, 1903. Serial No. 158,749. (No model.)

*To all whom it may concern:*

Be it known that we, ROBERT HENRY FOWLER, engineer, and GEORGE SCHOFIELD TUER, draftsman, citizens of England, both residing at Steam Plough Works, Leeds, in the county of York, England, have jointly invented certain new and useful Improvements in Road-Locomotives, (for which we have applied for a patent in Great Britain, dated January 24, 1903, No. 1,775,) of which the following is a specification.

This invention relates to improvements in road-locomotives, part thereof being particularly applicable to the engine described in British specification No. 14,242 of 1892. In that engine the hind-axle bearings are connected by links to compensating levers mounted at their centers on a pin suitably supported by springs. By the present invention the links are eliminated, and the ends of the compensating levers which they supported are now carried by bolts passing through brackets attached to the bearings, so that the axes of these bolts, the axis of the center pin, and the points of support of the other ends of the levers are in the same plane, and a line drawn through them is parallel to the hind axle. There is thus considerably more clearance under the axle above the ground-line with a given diameter of driving-wheel. In the engine of the kind described in the said specification it has hitherto been necessary to pass the hind axle through the bearings in mounting it, and this has involved pressing the part carried by one end of the axle into place after the axle has been put in position—an operation of difficulty save in a properly-equipped engineering-shop. By the present invention the axle is mounted in the bearings from beneath them, so that it can be put in position with its end fittings in place—an operation which can be effected anywhere with the aid of simple lifting appliances. This alteration also enables the winding-drum to be put on the axle thereof when the latter is in position, and the driving-plate can now be fixed in place before the engine erected.

Another improvement in engines of this class according to this invention consists in attaching the water-tank to the horn-blocks and horn-plates of the hind axle instead of attaching it to the projecting side plates of the boiler, which necessitated carrying the connecting-plates across the hind axle, thus preventing access to the various parts connected with the axle.

In the accompanying drawings, Figure 1 is a vertical sectional elevation through the hind axle of a road-engine, showing the improvements according to this invention. Fig. 2 is a vertical transverse section on line 2 2 of Fig. 1. Fig. 3 is a part longitudinal section on line 3 3 of Fig. 1, and Fig. 4 is a part section on line 4 4 of Fig. 1. Fig. 5 is a vertical section through winding-drum and driving-plate. Fig. 6 is a horizontal section through part of the water-tank and the hind axle of the engine, showing the method of attaching the tank.

Referring to Figs. 1 to 4, the bolt $a$ is supported on springs $b$, as in the engine described in British specification No. 14,242 of 1892, and at one end each lever $c$ is supported on the frame $d$, as before. The other end of each lever, however, is supported by a pin $e$, which passes through the end and also through brackets $f$, attached to the bearings $g$. In order that the hind axle $h$ may be readily mounted and dismounted, the lower part of each bearing is a piece $i$, separate from and sliding in the upper part of the bearing, and the bush is made in halves $k\ k'$. The sliding part of the bearing also has a bracket $i'$, through which the pin $e$ passes. To dismount the hind axle, the springs $b$ are removed by unscrewing nut $b'$, and the frame $d$ by unscrewing bolts $d'$. The pins $e$ are next removed, so that the levers $c$ can be taken down and the sliding parts $i$ and the under halves $k'$ of the bushes may be slid out, leaving the axle free to be separated from the body of the engine.

In Fig. 5 it will be seen that the winding-drum $l$ can be slid over the driving-plate $m$ on the axle $h$ from the outside, so that it is no longer necessary to remove the driving-plate before removing the drum, as it was in the case of the engine described in British specification No. 14,242 of 1892.

Fig. 6 illustrates the method of attaching the water-tank $n$ to the horn-blocks $o$. It will be seen that the side plates $p$ of the tank are extended beyond the end plate $q$ at that end of the tank which is attached to the engine and are reinforced by plates $r$. These latter plates are bent to form flanges $r'$, which are fastened to the horn-blocks by studs and nuts $r^2$ and to flanges on the horn-plates by bolts and nuts.

Having thus described the nature of our said invention and the best means we know of carrying the same into practical effect, we claim—

1. In a road-locomotive of the kind herein described, compensating levers pivoted on a central pin and supported at one end by the frame and at the other by pins passing through brackets attached to the bearings of the hind axle, substantially as described.

2. In a road-locomotive of the kind herein described, bearings for the hind axle in which the bush is made in halves and the block in two parts, the lower part of which slides in the upper part, substantially as and for the purpose specified.

3. In a road-locomotive of the kind herein described, a winding-drum $l$ adapted to slide over the driving-plate $m$ from the outside, substantially as described with reference to Fig. 5 of the accompanying drawings.

4. An attachment for water-tanks of road-locomotives comprising reinforcing-plates fixed inside the side plates of the tanks and fastened to horn-blocks mounted on the axle-bearings, and to plates in which the horn-blocks slide, substantially as described.

In testimony whereof we have hereunto set our hands in presence of two subscribing witnesses.

ROBERT HENRY FOWLER.
GEORGE SCHOFIELD TUER.

Witnesses:
JOHN WILLIAM THACKERAY,
ARTHUR ROUNDHILL.